United States Patent [19]

Morge

[11] 4,037,293
[45] July 26, 1977

[54] HINGE AND PANEL MOUNTING MEANS

[75] Inventor: Michael P. Morge, Oswego, Ill.

[73] Assignee: Caterpillar Tractor Co., Peoria, Ill.

[21] Appl. No.: 675,029

[22] Filed: Apr. 8, 1976

[51] Int. Cl.² ............................................. E05D 1/06
[52] U.S. Cl. .................................................. 16/171
[58] Field of Search ............... 49/465; 16/128 R, 171, 16/167, 136, 168, 162

[56] References Cited

U.S. PATENT DOCUMENTS

| 96,414 | 11/1869 | Foster | 16/128 R |
|---|---|---|---|
| 763,256 | 6/1904 | Burtis | 16/171 |
| 898,647 | 9/1908 | Herr | 16/171 |
| 3,231,929 | 2/1966 | Hiltanen et al. | 16/171 |
| 3,431,591 | 3/1969 | Betso | 16/171 |

Primary Examiner—G. V. Larkin
Attorney, Agent, or Firm—Wegner, Stellman, McCord, Wiles & Wood

[57] ABSTRACT

A vehicle having a housing portion defining an opening. A closure panel is provided for selectively closing the opening. The closure panel may be mounted to the housing portion by a hinge structure including a tubular female connector provided with an end portion having an outwardly opening opening. The closure panel may be provided with a male connector adapted to be passed transversely inwardly through the female connector opening into coaxial alignment with the tubular female connector, permitting axial movement of the male connector into the female connector to complete the hinged mounting of the closure panel on the housing portion. A male positioning member may be provided on a housing portion for positioning a closure panel suitably to close an opening in the housing portion for facilitated securing of the closure panel by suitable securing elements associated with the closure panel and housing portion.

5 Claims, 3 Drawing Figures

U.S. Patent  July 26, 1977  4,037,293
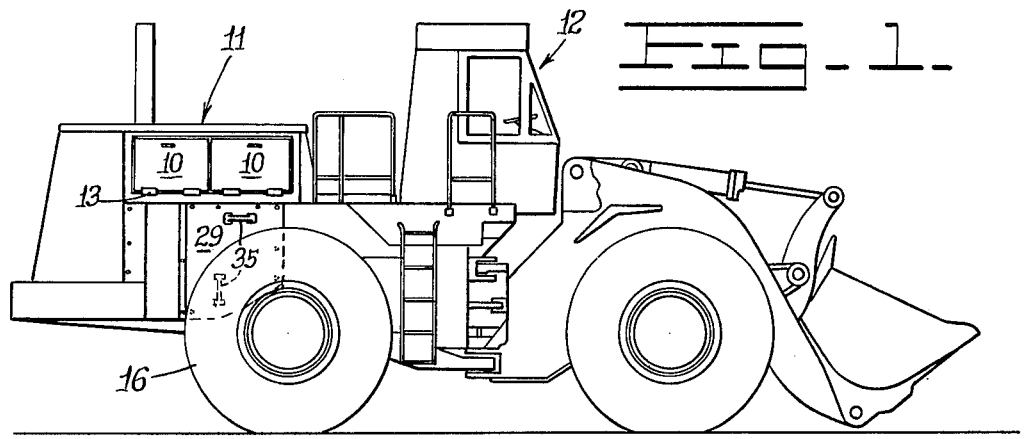
Fig_1_
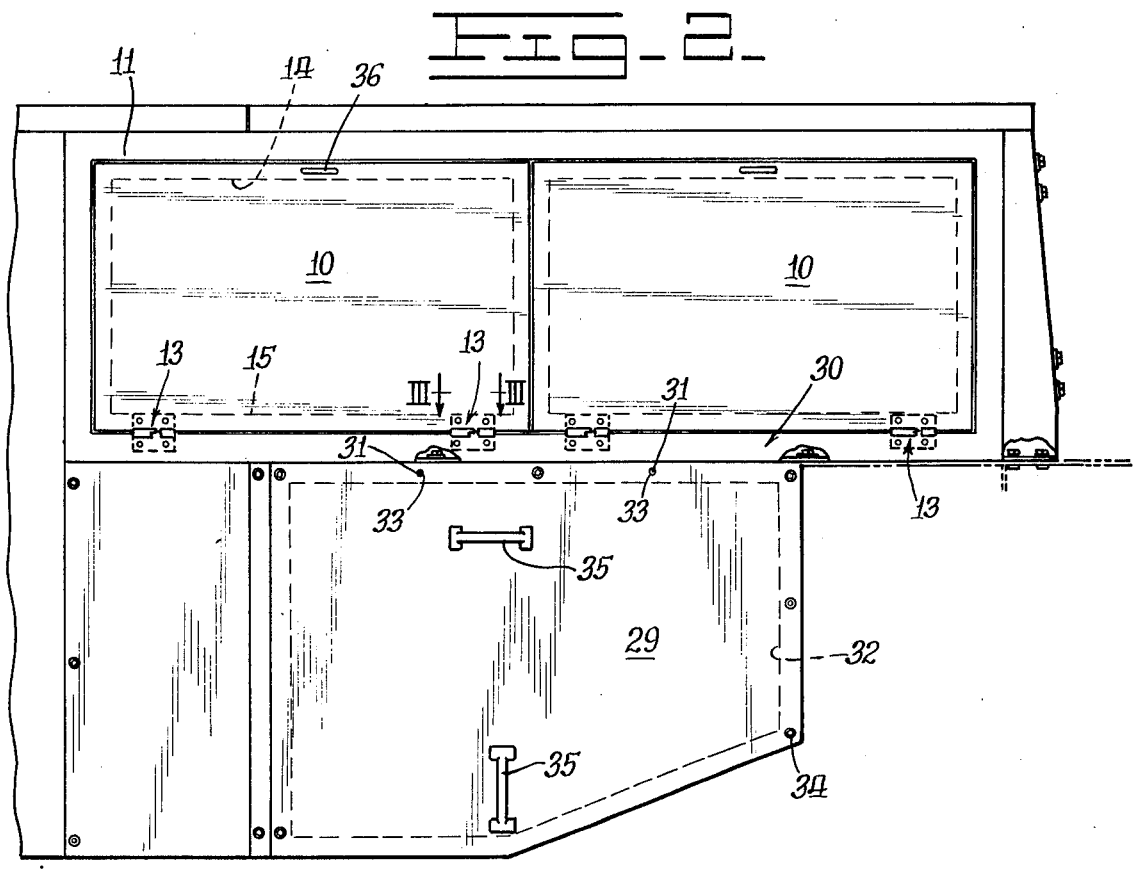
Fig_2_
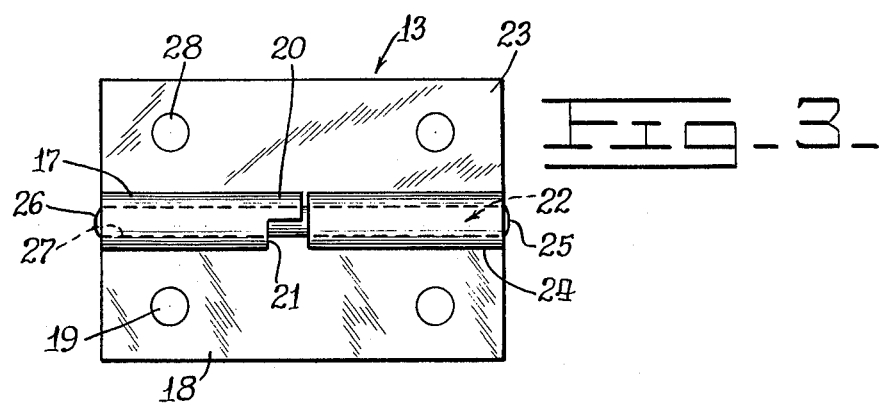
Fig_3_

HINGE AND PANEL MOUNTING MEANS

BACKGROUND OF THE INVENTION

1. Field of the Invention

This invention relates to vehicle structures and in particular to means for mounting closure panels to housing portions thereof.

2. Description of the Prior Art

In vehicles, such as earth moving equipment vehicles, housings are provided about the engine and other auxiliary components. Access openings are provided in such housings to permit facilitated access to the engine and components. Closure panels are provided for selectively closing the access openings. As such earth moving equipment is relatively large, the closure panels may be relatively large and heavy and mounting of the closure panels to the housing portions may be relatively difficult.

SUMMARY OF THE INVENTION

The present invention comprehends an improved mounting of closure panels in vehicles. In one form, the invention comprehends the provision of an improved hinge means for hingedly mounting a closure panel for selectively closing an access opening.

In the illustrated embodiment, the improved hinge means includes a tubular female connector fixedly carried by the housing portion adjacent the access opening to extend axially transversely relative to the opening. The female connector is provided with an end portion defining an outwardly opening opening for receiving a male connector. The male connector is fixedly carried on the closure panel and defines a cantilevered end which may be moved transversely inwardly through the female connector opening into coaxial alignment with the tubular female connector portion to permit subsequent axial movement of the male connector into the female tubular connector to complete the hinged mounting of the closure panel on the housing portion.

In the illustrated embodiment, the opening in the female connector end portion opens outwardly and transversely to the direction of opening of the access opening. More specifically in the illustrated embodiment, the female connector is disposed at the bottom of the access opening with the opening in the female connector end opening downwardly and outwardly from the housing portion. Thus, the male connector end may be brought inwardly and upwardly into coaxial alignment with the tubular portion of the female connector in effecting the mounting of the closure panel to the housing portion.

In the illustrated embodiment, the male connector may be secured to a tubular element mounted to the closure panel and defining a stop for limiting the insertion of the male connector into the female connector in the mounting operation.

The invention further comprehends the provision of an improved mounting means for mounting a closure panel to a housing portion including a male positioning member carried on the housing portion adjacent an access opening therein so as to project outwardly therefrom. Female means may be provided on the closure panel accurately fitting the male member when the closure panel is brought into aligned relationship with the access opening of the housing portion. Securing means may be provided for securing the closure panel in the accurately positioned arrangement, thereby to complete the mounting of the closure panel to the housing portion.

Thus, the closure panel mounting means of the present invention are extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a vehicle provided with closure panel mounting means embodying the invention;

FIG. 2 is a fragmentary enlarged side elevation thereof illustrating the closure panel mounting means in greater detail; and FIG. 3 is a vertical elevation of the closure panel mounting means of the present invention.

DESCRIPTION OF THE PREFERRED EMBODIMENTS

In the exemplary embodiments of the invention as disclosed in the drawing, a closure panel generally designated 10 is mounted to a housing portion generally designated 11 of a vehicle generally designated 12 by improved hinged mounting means generally designated 13 for selectively closing an access opening generally designated 14 in the housing portion 11. In the illustrated embodiment, each closure panel 10 is provided with a pair of such hinge means 13 which, as best seen in FIG. 2, are disposed at the bottom 15 of the access opening 14.

As best seen in FIG. 1, housing portion 11 may be disposed adjacent rear wheels 16 of vehicle 12 whereby installation and removal of the closure panels may be somewhat inconvenient. The present invention comprehends an improved hinged mounting means 13 which facilitates the installation of the closure panels.

More specifically as seen in FIG. 3, each hinged mounting means 13 includes a tubular female connector 17 which may be mounted to the housing portion 11 by an integral plate portion 18 and suitable fastening means, such as screws 19.

The female connector extends axially transversely to the opening 14, i.e., across the face of the opening, and in the illustrated embodiment, extends horizontally.

The female connector 17 includes an end portion 20 which defines an opening, or notch 21. Opening 21 opens outwardly and downwardly, as best seen in FIG. 3. More specifically, as seen in FIG. 3, opening 21 is defined by the lower half of the tubular configuration of the female connector.

Hinge means 13 further includes a male connector generally designated 22 which is carried by the closure panel 10 by means of a plate 23 carrying a tubular mounting element 24 receiving one end 25 of the male connector. The opposite end 26 of the male connector is cantilevered outwardly from the tubular mounting member 24 and is adapted to be freely received in the tubular female connector 17 upon axial insertion thereof into the female connector.

The opening 21 provides an improved facilitated insertion of the male connector portion 26 into the female connector by permitting the male connector portion 26 to be moved rearwardly and upwardly through the opening into alignment with the bore 27 of the female connector, whereupon the male connector portion 26 may be moved axially into the bore to the mounted position of FIG. 3. In moving into the aligned relationship with bore 27, male connector end portion 26 may be brought upwardly into abutment with the overlying end portion 20 of the female connector which automatically axially aligns the male connector end portion 26 with the female connector bore 27, thereby simplifying and facilitating the installation of the enclosure panel on the housing portion 11.

Mounting plate 23 of the male connector means may be secured to the closure panel 10 by suitable securing means, such as screws 28, so that when the male connector end 26 is coaxially received in the female connector 17, the panel will be accurately positioned across the access opening 14, as seem in FIG. 2.

The closure panel may be readily removed from the housing portion 11 by a simple reverse operation wherein the male connector end 26 is withdrawn axially from the female connector 17 by a movement of the closure panel transversely to the opening 14 until the end 26 is withdrawn from the tubular female connector to terminate within the opening 21.

The invention further comprehends the provision of a modified form of closure panel positioning means for facilitating installation and removal of a closure panel from such a vehicle housing portion. Thus, as seen in FIGS. 1 and 2, a closure panel generally designated 29 may be secured to another portion generally designated 30 of the housing for facilitated installation and removal. Housing portion 30 may be provided with a plurality of male positioning members 31 mounted thereto adjacent the access opening 32. Closure panel 29 may be provided with a plurality of cooperating female means 33 accurately fitting the male members 31 for accurately positioning the closure panel 29 across the access opening 32.

In the illustrated embodiment, the male positioning members project outwardly from the housing in the direction of opening of the access opening 32. The female connector means 33 may define suitable openings in the closure panel is preselected positions thereof to provide accurate alignment of securing means, such as screw 34 with cooperating securing means on the housing portion (not shown) so that the relatively heavy closure panel 29 may be readily installed with the securing means accurately positioned for facilitated installation.

The male positioning members 31 may be relatively strong so as to carry the closure panel 29 prior to the installation of the securing means 34, thus further facilitating the installation of the closure panel across opening 32. As shown in FIG. 2, suitable handles 35 may be further provided on the closure panel 29 for facilitating installation and removal of the closure panel relative to the housing portion 30.

The securing elements 34 effectively retain closure panel 29 in position to maintain access opening 32 closed. To provide similar maintained closure of access opening 14, suitable latching means 36 may be provided on closure panel 10 and housing portion 11.

Thus, the invention comprehends an improved mounting of closure panels in vehicles, such as earth moving vehicles, providing facilitated installation and removal of the closure panels relative to housing portions of the vehicle, such as housing portions housing the engine and associated components. The invention provides such facilitated installation and removal and facilitated access to the engine and components, notwithstanding the location of the housing portion in somewhat inconvenient positions, such as inwardly of the rear wheels of the vehicle.

The foregoing disclosure of specific embodiments is illustrative of the broad inventive concepts comprehended by the invention.

I claim:

1. In a vehicle having a vertically extending housing portion provided with an opening, said housing portion defining a horizontally extending edge portion at a lower edge of said opening, and a closure panel for selectively closing said opening and having a lower edge portion, improved hinge means for hingedly mounting said closure panel lower edge portion to said housing edge portion, said hinge means comprising: a tubular female connector fixedly carried by said housing edge portion adjacent said opening thereof with the bore of the female connector extending axially horizontally, said female connector having an end portion defining a downwardly opening notch; and a male connector fixedly carried by said closure panel lower edge portion and having a cantilevered end defining a horizontal axis spaced outwardly from said closure panel to be passed transversely upwardly through said female connector notch into abutment with the female connector above the notch thereby to cause the male connector to be disposed in coaxial alignment with said tubular female connector bore to be moved axially horizontally thereinto to hingedly mount said closure panel to said housing.

2. The vehicle structure of claim 1 wherein a tubular mounting element is secured to said closure panel and said male connector is fixedly secured to said tubular mounting element.

3. The vehicle structure of claim 1 wherein a tubular mounting element is secured to said closure panel and said male connector is fixedly secured to said tubular mounting element, said tubular mounting element having an outer diameter substantially similar to that of said tubular female connector and being coaxially juxtaposed to said female connector when said male connector end is received in said female connector.

4. The vehicle structure of claim 1 wherein said female connector notch is semiannular.

5. The vehicle structure of claim 1 further including a second pair of similar cooperating female and male connectors on said housing and closure panel.

* * * * *

UNITED STATES PATENT AND TRADEMARK OFFICE
CERTIFICATE OF CORRECTION

PATENT NO. : 4,037,293

DATED : July 26, 1977

INVENTOR(S) : Michael P. Morge

It is certified that error appears in the above—identified patent and that said Letters Patent are hereby corrected as shown below:

Column 3, line 41, after "panel", cancel "is" and correct to read --in--.

Signed and Sealed this

Thirteenth Day of December 1977

[SEAL]

Attest:

RUTH C. MASON
Attesting Officer

LUTRELLE F. PARKER
Acting Commissioner of Patents and Trademarks